United States Patent
Chen et al.

(10) Patent No.: US 8,692,142 B2
(45) Date of Patent: Apr. 8, 2014

(54) CIRCUIT FOR DETERMINING POSITIONS OF CONTACTS ON CAPACITIVE POSITION DETECTING PANEL, TOUCH PANEL MODULE AND METHOD FOR DETECTING CONTACTS ON CAPACITIVE POSITION DETECTING PANEL

(75) Inventors: Chung-Chun Chen, Hsin-Chu (TW); Cheng-Chiu Pai, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 388 days.

(21) Appl. No.: 13/236,653

(22) Filed: Sep. 20, 2011

(65) Prior Publication Data
US 2012/0235950 A1 Sep. 20, 2012

(30) Foreign Application Priority Data
Mar. 17, 2011 (TW) .............................. 100109159 A (51) Int. Cl.
*G06F 3/041* (2006.01)
(52) U.S. Cl.
USPC .................. 178/18.01; 178/18.02; 178/18.03; 178/18.04; 178/18.05; 178/18.06; 345/173; 345/174
(58) Field of Classification Search
USPC ...................... 345/173–174; 178/18.01–18.06
See application file for complete search history.

(56) References Cited

U.S. PATENT DOCUMENTS

| | | | |
|---|---|---|---|
| 8,421,774 B2 * | 4/2013 | Wang et al. ................... | 345/174 |
| 8,519,970 B2 * | 8/2013 | Westhues et al. ............. | 345/173 |
| 2009/0096758 A1 | 4/2009 | Hotelling et al. | |
| 2009/0167718 A1 | 7/2009 | Lee | |
| 2010/0245286 A1 | 9/2010 | Parker | |
| 2010/0289769 A1 | 11/2010 | Watanabe | |

FOREIGN PATENT DOCUMENTS

| CN | 101470556 A | 7/2009 |
|---|---|---|
| JP | 2010282462 A | 12/2010 |

* cited by examiner

*Primary Examiner* — Kent Chang
*Assistant Examiner* — Kuo Wong
(74) *Attorney, Agent, or Firm* — Winston Hsu; Scott Margo (57) ABSTRACT

The invention provides a circuit for determining positions of contacts on a capacitive position detecting panel. The capacitive position detecting panel includes a plurality of sensing lines and driving lines. The circuit includes a plurality of first amplifiers and second amplifiers. The first amplifiers respectively connect to the sensing lines, and the second amplifiers respectively connect to the driving lines. Input nodes of the first amplifiers are connected to a first input signal source, and input nodes of the second amplifiers are selectively connected to the first input signal source or a second input signal source. When the circuit is operated under a first operation mode, the input nodes of the second amplifiers are connected to the first input signal source; and when the circuit is operated under a second operating mode, the input modes of a plurality of specific second amplifiers are connected to the second input signal source.

12 Claims, 8 Drawing Sheets

CIRCUIT FOR DETERMINING POSITIONS OF CONTACTS ON CAPACITIVE POSITION DETECTING PANEL, TOUCH PANEL MODULE AND METHOD FOR DETECTING CONTACTS ON CAPACITIVE POSITION DETECTING PANEL

BACKGROUND OF THE INVENTION

1. Field of the Invention

The present invention relates to a circuit for determining positions of contacts on a capacitive position sensing panel, and more particularly, to a circuit using self capacitance and mutual capacitance sensing methods to determine positions of contacts on a capacitive position sensing panel.

2. Description of the Prior Art

Regarding operations of human-machine interface (HMI), position sensing is a widely used function which can be categorized into one of a resistive sensing method, an optical sensing method, an acoustic sensing method, a capacitive sensing method, etc. Due to the fact that the capacitive position sensor does not require stress-strain deformation, has a higher immunity against ambient light and the temperature, and employs a less complex manufacture process, the capacitive position sensing technique is therefore considered to be the most practical one to be part of an integrated process.

Sensing methods of a capacitive position sensor can be divided into a self capacitance sensing method and a mutual capacitance sensing method, wherein the self capacitance sensing method possesses ghosting and snap problems when determining positions of contacts. Thus, when the self capacitance sensing method is used to detect more than two contacts, problems such as misjudgment and indefinite position determination will occur. On the other hand, the mutual capacitance sensing method can accurately detect more than two contacts; however, since the mutual capacitance sensing method uses a step-by-step driving method to detect the contacts, it has stricter requirements on the sensing resolution and operation speed.

SUMMARY OF THE INVENTION

Therefore, one of the objectives of the present invention is to provide a circuit for determining positions of contacts on a capacitive position detecting panel, a touch panel module and method for detecting contacts on a capacitive type touch panel that use self capacitance and mutual capacitance sensing methods to determine positions of contacts on a capacitive position sensing panel to solve the aforementioned problem.

According to one embodiment of the present invention, a circuit for determining positions of contacts on a capacitive position sensing panel is disclosed, wherein the capacitive position sensing panel comprises a plurality of sensing lines and a plurality of driving lines, and the sensing lines and the driving lines are intersected, and the circuit includes a plurality of first amplifiers and a plurality of second amplifiers. The plurality of first amplifiers are respectively coupled to the sensing lines, for detecting whether the sensing lines have contact(s) presented thereon, wherein regarding each of the first amplifiers, a first input terminal of the first amplifier is coupled to a first input signal source, and a second input terminal of the first amplifier is coupled to an output terminal of the first amplifier via a first capacitor. The plurality of second amplifiers are respectively coupled to the driving lines, for detecting whether the driving lines have contact(s) presented thereon, wherein regarding each of the second amplifiers, a first input terminal of the second amplifier is selectively coupled to the first input signal source or a second input signal source via a switch, and a second input terminal of the second amplifier is coupled to an output terminal of the second amplifier via a second capacitor. Wherein when the circuit operates in a first operating mode, the first input terminal of each of the second amplifiers is coupled to the first input signal source, and when the circuit operates in a second operating mode, first input terminals of a plurality of specific second amplifiers included in the second amplifiers are coupled to the second input signal source.

According to another embodiment of the present invention, a touch panel module including a capacitive position sensing panel and an integrated circuit is disclosed, wherein the capacitive position sensing panel has a plurality of sensing lines and a plurality of driving lines disposed thereon, and the integrated circuit includes a plurality of first amplifiers and a plurality of second amplifiers. The plurality of first amplifiers are respectively coupled to the sensing lines of the capacitive position sensing panel, for detecting whether the sensing lines have contact(s) presented thereon, wherein regarding each of the first amplifiers, a first input terminal of the first amplifier is coupled to a first input signal source, and a second input terminal of the first amplifier is coupled to an output terminal of the first amplifier via a first capacitor. The plurality of second amplifiers are respectively coupled to the driving lines of the capacitive position sensing panel, for detecting whether the driving lines have contact(s) presented thereon, wherein regarding each of the second amplifiers, a first input terminal of the second amplifier is selectively coupled to the first input signal source or a second input signal source via a switch, and a second input terminal of the second amplifier is coupled to an output terminal of the second amplifier via a second capacitor. Wherein when the integrated circuit operates in a first operating mode, the first input terminal of each of the second amplifiers is coupled to the first input signal source, and when the integrated circuit operates in a second operating mode, first input terminals of a plurality of specific second amplifiers included in the second amplifiers are coupled to the second input signal source.

According to yet another embodiment of the present invention, a method for detecting contacts on a capacitive position sensing panel is disclosed, wherein the capacitive position sensing panel comprises a plurality of sensing lines and a plurality of driving lines, and the sensing lines and the driving lines are intersected, the method including: when the capacitive position sensing panel operates in a first operating mode, detecting contacts on the capacitive position sensing panel to obtain a plurality of candidate contacts; when the capacitive position sensing panel operates in a second operating mode, detecting contacts on the capacitive position sensing panel to select part of the candidate contacts as actual contacts on the capacitive position sensing panel; when the capacitive position sensing panel operates in the first operating mode, providing a first input signal such that voltage levels of the sensing lines and the driving lines are substantially equal to a voltage level of the first input signal; and when the capacitive position sensing panel operates in the second operating mode, providing a second input signal such that voltage levels of the driving lines which are corresponding to the candidate contacts are substantially equal to a voltage level of the second input signal.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
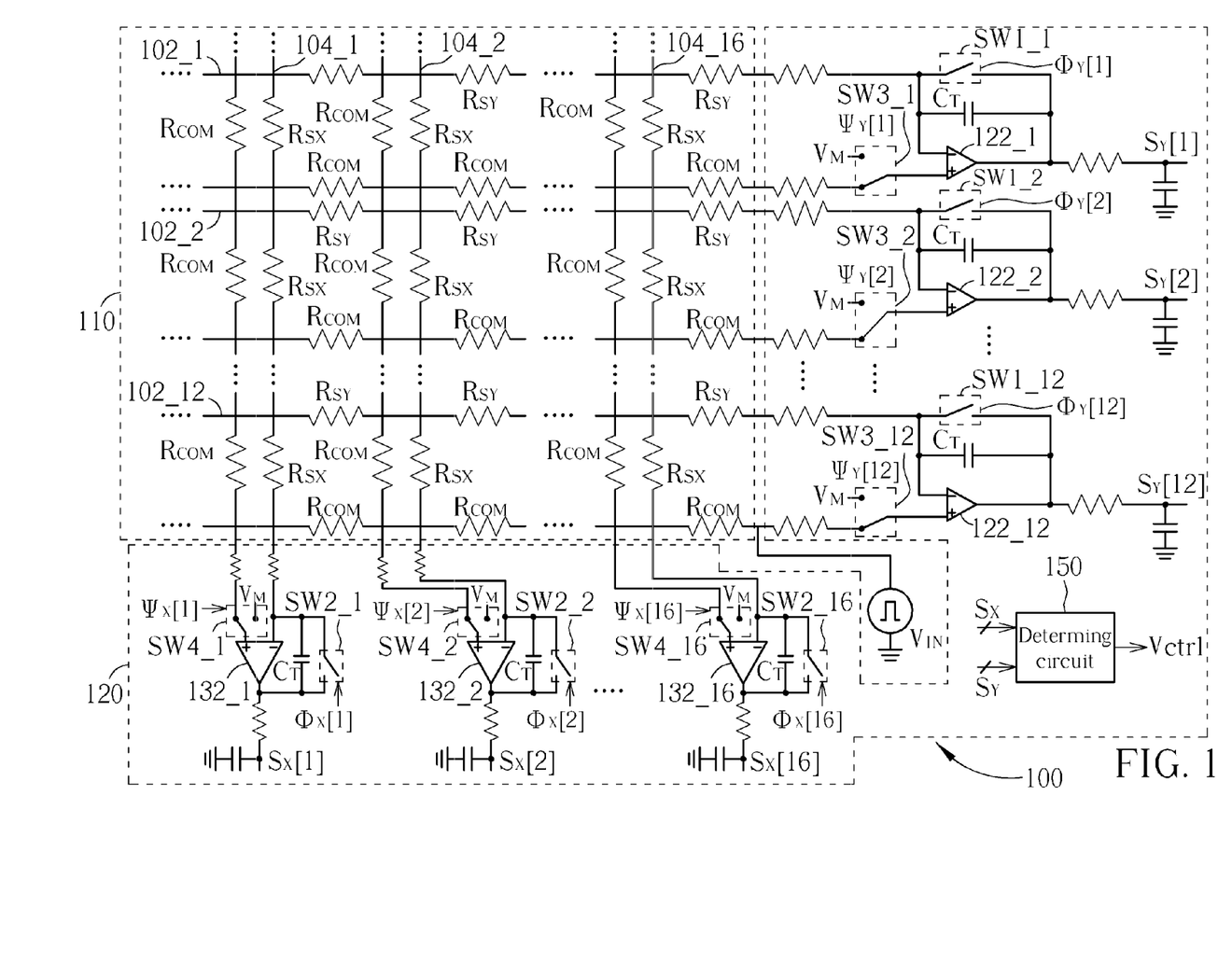
FIG. 1 is a schematic diagram of a touch panel module that is operating in a first operating mode according to an embodiment of the present invention.

Please refer to FIG. 1, which is a schematic diagram of a touch panel module 100 according to an embodiment of the present invention. As shown in FIG. 1, the touch panel module 100 includes a capacitive position sensing panel 110 and an integrated circuit 120, wherein the capacitive position sensing panel 110 has a plurality of sensing lines (e.g., 12 sensing lines 102_1-102_12 in this embodiment) and a plurality of driving lines (e.g., 16 driving lines 104_1-104_16 in this embodiment) disposed thereon, and the sensing lines and the driving lines are intersected. As shown in FIG. 1, $R_{sy}$ and $R_{sx}$ are respectively representative of sectional resistances of the sensing lines and the driving lines, while $R_{COM}$ is representative of the sectional resistance of common electrode. The integrated circuit 120 includes a plurality of first amplifiers (e.g., 12 first amplifiers 122_1-122_12 in this embodiment), a plurality of second amplifiers (e.g., 16 second amplifiers 132_1-132_16 in this embodiment) and a determining circuit 150. Regarding each of the first amplifiers 122_1-122_12, a negative input terminal of the first amplifier is coupled to an output terminal of the first amplifier respectively via switches SW1_1-SW1_12 and a capacitor $C_T$, and a positive input terminal of the first amplifier is selectively coupled to a first input signal source $V_{IN}$ or a second signal source $V_M$ via switches SW3_1-SW3_12. Regarding each of the second amplifiers 132_1-132_16, a negative input terminal of the second amplifier is coupled to an output terminal of the second amplifier respectively via switches SW2_1-SW2_16 and the capacitor $C_T$, and a positive input terminal of the second amplifier is selectively coupled to the first input signal source $V_{IN}$ or the second signal source $V_M$ via switches SW4_1-SW4_16. In addition, the switches SW1_1-SW1_12 are respectively controlled by control signals $\phi_Y[1]$-$\phi_Y[12]$, the switches SW2_1-SW1_16 are respectively controlled by control signals $\phi_X[1]$-$\phi_X[16]$, the switches SW3_1-SW3_12 are respectively controlled by control signals $\psi_Y[1]$-$\psi_Y[12]$, and the switches SW4_1-SW4_16 are respectively controlled by control signals $\psi_X[1]$-$\psi_X[16]$.

As to the operation of the touch panel module 100, the touch panel module 100 first operates in a first operating mode. That is, the self capacitance sensing method is used to detect contacts on the capacitive position sensing panel 110.

As shown in FIG. 1, the switches SW1_1-SW1_12 and SW2_1-SW2_16 are all turned off, the positive input terminals of the first amplifiers 122_1-122_12 and the second amplifiers 132_1-132_16 are coupled to the first input signal source $V_{IN}$ respectively via the switches SW3_1-SW3_12 and SW4_1-SW4_16. Regarding the determining circuit 150, it receives signals $S_Y[1]$-$S_Y[12]$ from the output terminals of the first amplifiers 122_1-122_12 and receives signals $S_X[1]$-$S_X[16]$ from the output terminals of the second amplifiers 132_1-132_16, and accordingly determines which sensing lines or driving lines have contacts presented thereon.

Figure 2:
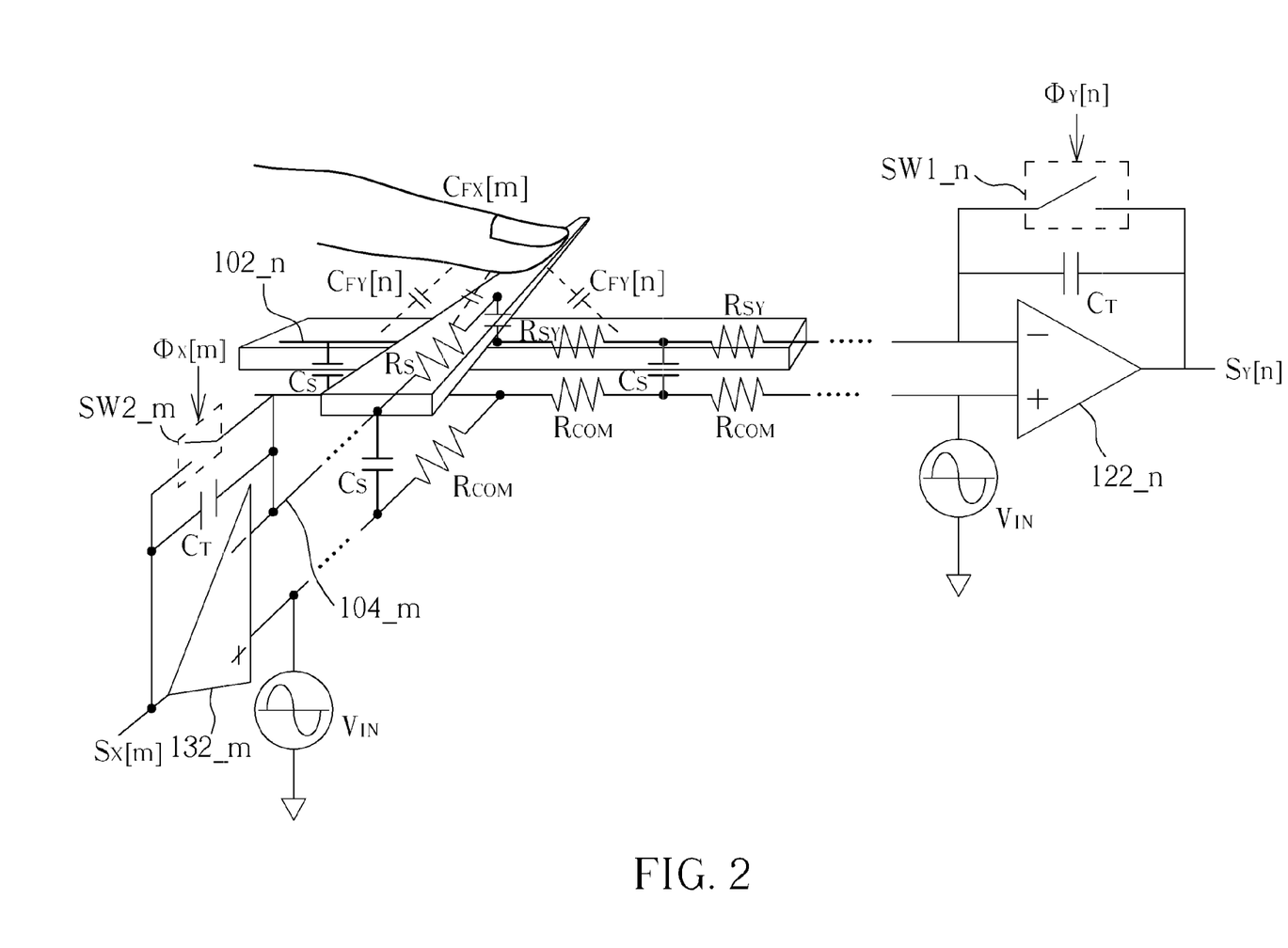
FIG. 2 is a schematic diagram of the touch panel module detecting contacts in the first operating mode according to an embodiment of the present invention.
Figure 3:
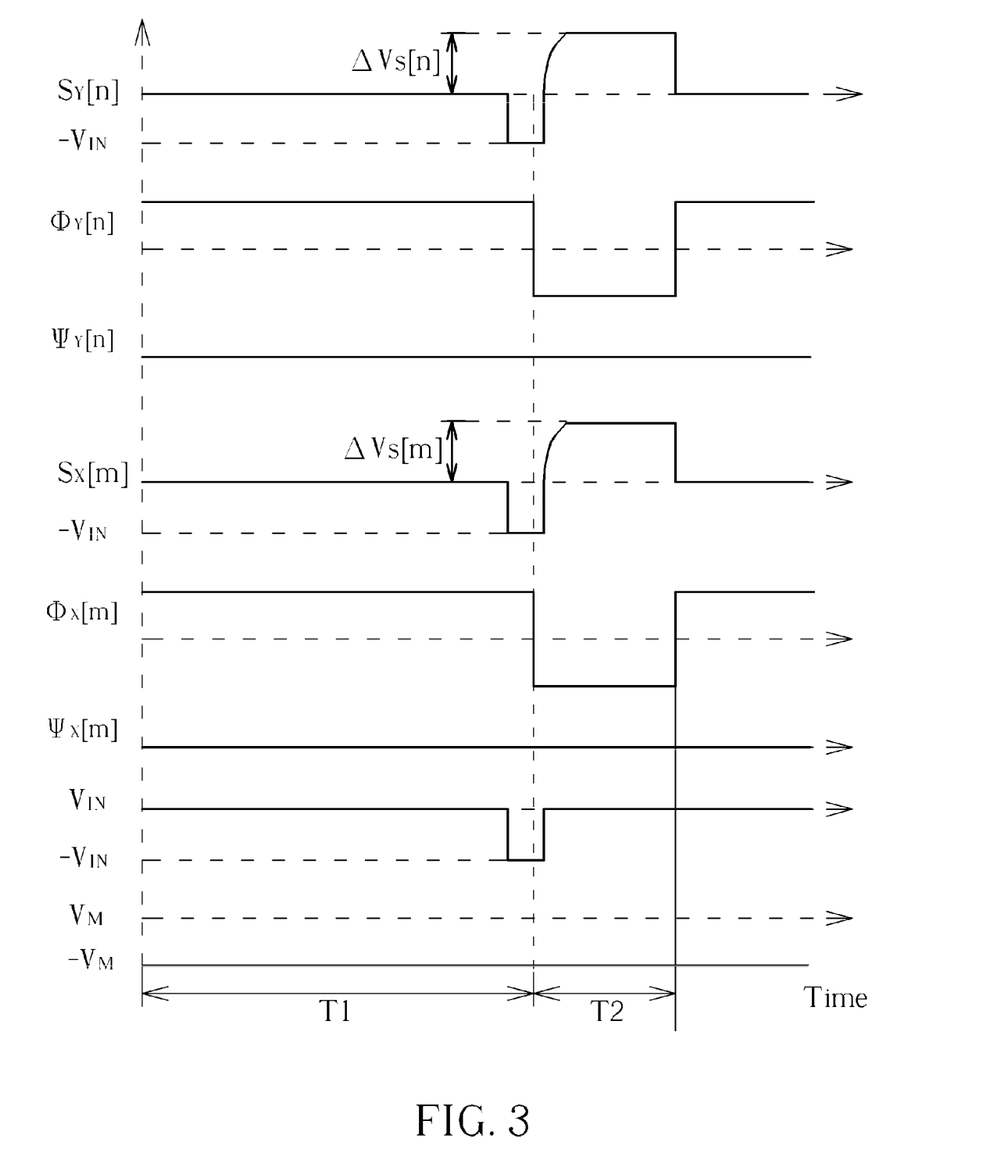
FIG. 3 is a timing diagram of all signals when the touch panel module operating in the first operating mode.

In detail, please prefer to FIG. 2 in conjunction with FIG. 3. FIG. 2 is a schematic diagram of the touch panel module 100 detecting contacts in the first operating mode according to an embodiment of the present invention, and FIG. 3 is a timing diagram of all signals when the touch panel module operating in the first operating mode. At time T1 shown in FIG. 3, the touch panel module 100 neither operates in the first operating mode nor operates in the second operating mode, and thus the control signals $\phi_Y[n]$ and $\phi_X[m]$ respectively control the switches SW1_n and SW2_m to be turned on. That is, the first amplifiers 122_n and the second amplifiers 132_m can be regarded as buffer amplifiers at this moment. At time T2 shown in FIG. 3, the touch panel module 100 operates in the first operating mode, and the control signals $\phi_Y[n]$ and $\phi_X[m]$ respectively control the switches SW1_n and SW2_m to be turned off. Referring to FIG. 2, assuming that a contact is located on the sensing line 102_n and driving line 104_m, the output signal $S_Y[1]$ of the amplifiers 122_n and the output signal $S_X[m]$ of the amplifiers 132_m can be expressed by following formulas:

$$S_Y[n]=(1+\Sigma C_{Fy}[n]/C_T)\cdot V_{IN}(t)-V_{IN}(t), t\geq 0$$

$$\Delta V_S[n]=(\Sigma C_{Fy}[n]/C_T)\cdot V_{in}$$

$$S_X[m]=(1+\Sigma C_{Fx}[m]/C_T)\cdot V_{IN}(t)-V_{IN}(t), t\geq 0$$

$$\Delta V_S[m]=(\Sigma C_{Fx}[m]/C_T)\cdot V_{in}$$

Therefore, the determining circuit 150 determines whether there is a contact on the sensing line 102_n and the driving line 104_m by detecting the voltage level variations of the output signal $S_Y[n]$ and $S_x[m]$. In addition, as deductions and implications of the aforementioned formulas should be readily understood by those skilled in the art, detailed description is therefore omitted herein.

Note that, FIG. 2 and FIG. 3 merely illustrate a scenario of detecting a contact on a single sensing line and a single driving line; however, in a practical application, the integrated circuit 120 will simultaneously detect all the sensing lines and all driving lines. That is, when the touch panel module 100 operates in the first operating mode, the switches SW1_1-SW1_12 and SW2_1-SW2_16 are all turned off, and the first amplifiers 122_1-122_12 and the second amplifiers 132_1-132_16 generate output signals $S_Y[1]$-$S_Y[12]$ and $S_X[1]$-$S_X[16]$ to the determining circuit 150 at the same time.

However, if the capacitive position sensing panel 110 has multiple contacts presented thereon, using the self capacitance sensing method cannot accurately determine actual positions of the contacts, and only can determine which sensing lines and driving lines have contacts presented thereon. Therefore, if the capacitive position sensing panel 110 has two contacts actually, the self capacitance sensing method would determine that there are four possible contacts; if the capacitive position sensing panel 110 has three contacts actually, the self capacitance sensing method would determine that there are nine possible contacts; and so on. This results in the so-called ghosting phenomenon.

Next, in order to precisely determine the locations of the contacts, after the touch panel module 100 operates in the first operating mode and determines which sensing lines and driving lines have contacts presented thereon, the touch panel module 100 enters the second operating mode (i.e., the touch panel module 100 uses the mutual capacitance sensing method to detect contacts on the capacitive position sensing panel 110).

Figure 4:
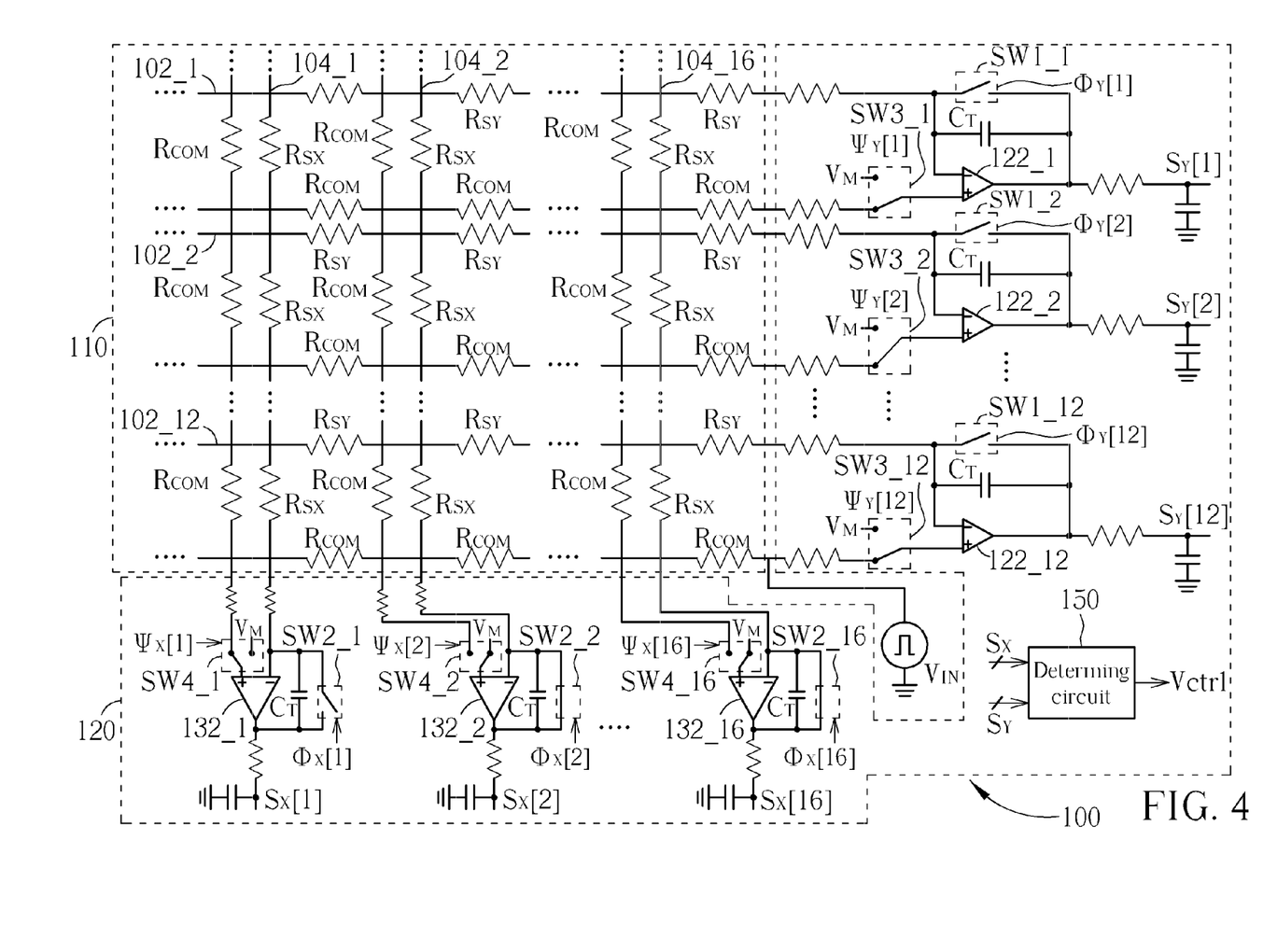
FIG. 4 is a diagram illustrating the touch panel module shown in FIG. 1 that is operating in a second operating mode.

When the touch panel module 100 operates in the second operating mode, the integrated circuit 120 first determines some specific second amplifiers from the second amplifiers 132_1-132_16 according to a detection result of the touch panel module 100 operating in the first operating mode that shows which driving lines have contacts presented thereon. For example, assuming that the integrated circuit 120 determines driving lines 104_2 and 104_16 have contacts presented thereon when operating in the first operating mode, the second amplifiers 132_2 and 132_16 are selected as the specific second amplifiers. Next, please refer to FIG. 4. Assuming that the driving lines 104_2 and 104_16 have contacts presented thereon and the second amplifiers 132_2 and 132_16 are selected as the specific second amplifiers, the positive input terminals of the second amplifiers 132_2 and 132_16 (i.e., specific second amplifiers) are coupled to the second signal source $V_M$ respectively via the switches SW4_2 and SW4_16, while the positive input terminals of the first amplifiers 122_1-122_12 and other second amplifiers are coupled to the first input signal source $V_{IN}$. In addition, the switches SW2_2 and SW2_16 are turned on, and the switches SW3_1-SW3_12, SW4_1, and SW4_3-SW4_15 are turned off.

Figure 5:
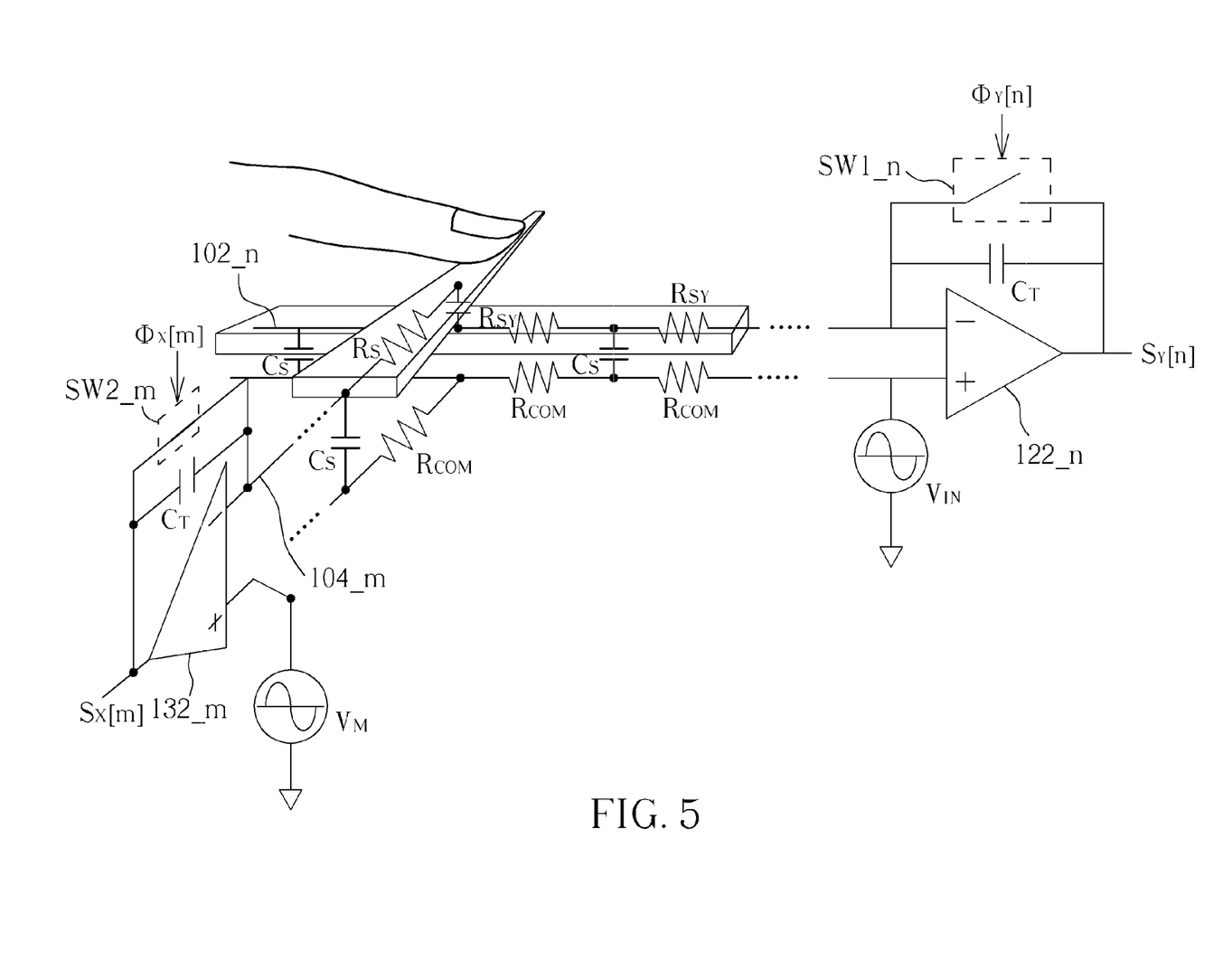
FIG. 5 is a schematic diagram of the touch panel module detecting contacts in the second operating mode according to an embodiment of the present invention.
Figure 6:
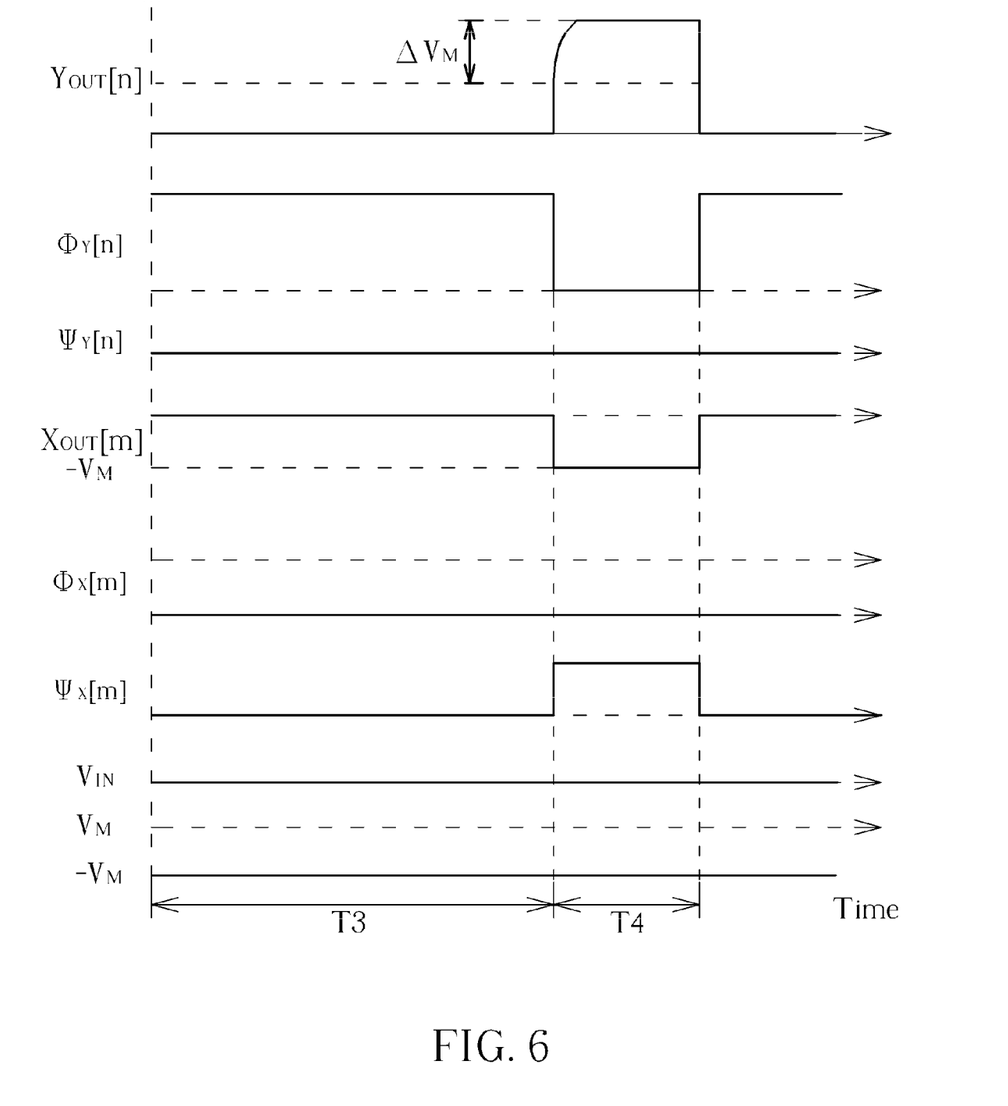
FIG. 6 is a timing diagram of all signals when the touch panel module operating in the second operating mode.

In detail, please refer to FIG. 5 in conjunction with FIG. 6. FIG. 5 is a schematic diagram of the touch panel module 100 detecting contacts in the second operating mode according to an embodiment of the present invention, and FIG. 6 is a timing diagram of all signals when the touch panel module 100 operating in the second operating mode. At time T3 shown in FIG. 6, the touch panel module 100 neither operates in the first operating mode nor operates in the second operating mode, and thus the control signals $\phi_Y[n]$ and $\phi_X[m]$ respectively control the switches SW1_n and SW2_m to be turned on. That is, the first amplifiers 122_n and the second amplifiers 132_m can be regarded as buffer amplifiers at this moment. At time T4 shown in FIG. 6, the touch panel module 100 operates in the second operating mode, and the control signals $\phi_Y[n]$ controls the switches SW1_n to be turned off. Referring to FIG. 5, assuming that a contact is located on sensing line 102_n and driving line 104_m, the output signal $S_Y[n]$ of the amplifier 122_n and the output signal $S_X[m]$ of the amplifier 132_m can be expressed by following formulas:

$$S_Y[n] = \frac{(C_T - (C_C + C_M[m, n]))}{C_T} \cdot V_{IN}(t) - \frac{(C_C + C_M[m, n])}{C_T} \cdot V_M,$$
$$t \geq 0$$
$$S_X[m] = V_M(t), t \geq 0$$
$$\Delta V_M[m, n] = -\frac{(C_M[m, n] - C'_M[m, n])}{C_T} \cdot V_M(t), t \geq 0$$

Wherein the $C_c$ is a coupling capacitance of one driving line and another neighboring driving line, and the $C_m$ is a coupling capacitance of one driving line and one neighboring sensing line.

Therefore, the determining circuit 150 determines whether there is a contact on the sensing line 102_n and the driving line 104_m by detecting the voltage level variations of the output signal $S_Y[n]$ and $S_X[m]$. In addition, as deductions and implications of the aforementioned formulas should be readily understood by those skilled in the art, detailed description is therefore omitted herein.

Note that, assuming that the integrated circuit 120 determines driving lines 104_2 and 104_16 have contacts presented thereon when operating in the first operating mode, and then selects the second amplifiers 132_2 and 132_16 as the specific second amplifiers, the integrated circuit 120 will simultaneously detect all the output signals of the first and second amplifiers on the driving line 104_2 and 104_16 when operating in the second operating mode. That is, the output signals $S_Y[1]$-$S_Y[12]$ of the first amplifiers 122_1-122_12 and the output signals $S_X[2]$ and $S_X[16]$ of the second amplifiers 132_2 and 132_16 will be generated at the same time. Next, the determining circuit 150 receives signals $S_Y[1]$-$S_Y[12]$, $S_X[2]$ and $S_X[16]$ to determine actual positions of the contacts on the capacitive position sensing panel 110.

Figure 7:
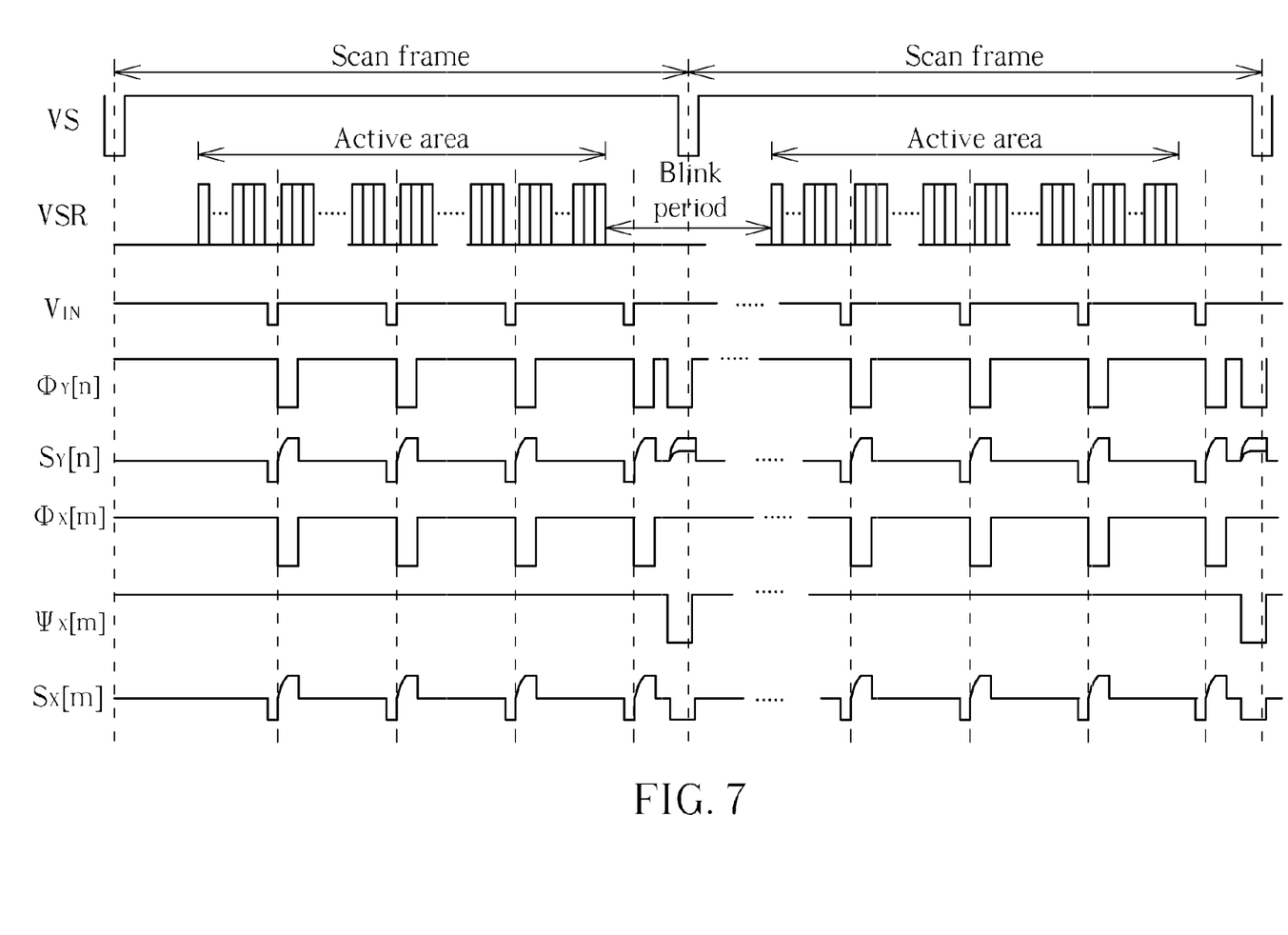
FIG. 7 is a timing diagram of the touch panel module operating in the first and second operating modes according to an embodiment of the present invention.

Please refer to FIG. 7, which is a timing diagram of the touch panel module 100 operating in the first and second operating modes according to an embodiment of the present invention. As shown in FIG. 7, the touch panel module 100 operates in the first operating mode several times (e.g., 3 times in this embodiment) in an active area of a scan frame. That is, when in the active area, the integrated circuit 120 performs the self capacitance sensing method several times to determine which sensing lines or driving lines have contacts presented thereon. The touch panel module 100 operates in the second operating mode during a blanking period of the scan frame. That is, the integrated circuit 120 performs the mutual capacitance sensing method according to the sensing results of the previously executed self capacitance sensing method, and accordingly determines actual positions of the contacts on the capacitive position sensing panel 110.

In addition, in another embodiment of the present invention, the switches SW3_1-SW3_12 may be omitted. That is, the positive input terminals of the first amplifiers 122_1-122_12 are directly connected to the first input signal source $V_{IN}$. This modification should also fall within the scope of the present invention.

Besides, in the aforementioned paragraphs, "sensing line" and "driving line" are merely used to indicate intersected lines on the capacitive position sensing panel 110, and are not used to define absolute directions. That is, on the capacitive position sensing panel 110, lines with one direction may be regarded as sensing lines, while lines with another direction may be regarded as driving lines.

Figure 8:
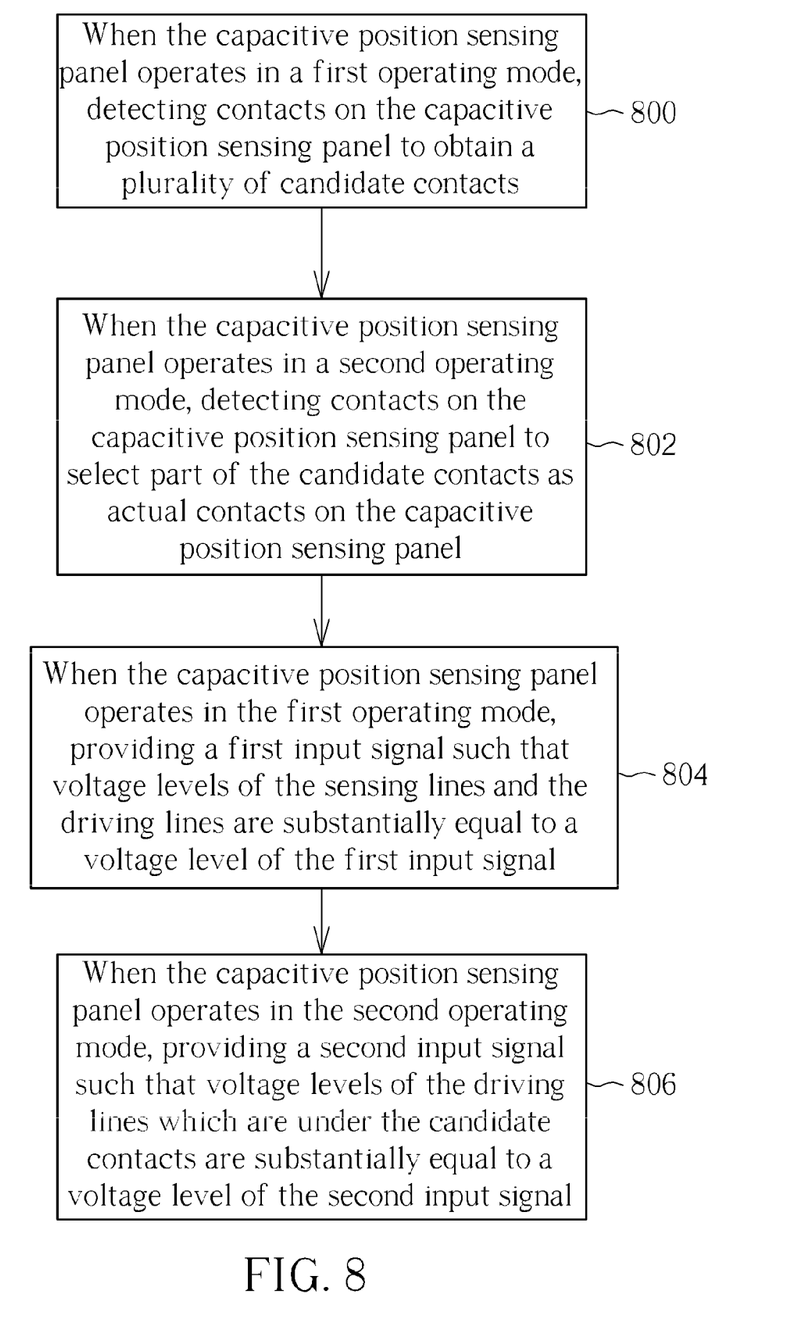
FIG. 8 is a flowchart of a method for detecting contacts on a capacitive type touch panel according to an embodiment of the present invention.

Please refer to FIG. 8, which is a flowchart of a method for detecting contacts on a capacitive type touch panel according to an embodiment of the present invention, wherein the capacitive position sensing panel includes a plurality of sensing lines and a plurality of driving lines, and the sensing lines and the driving lines are intersected. Please refer to FIGS. 1, 4 and 8 at the same time. The process is narrated as the following steps:

Step 800: When the capacitive position sensing panel operates in a first operating mode, detect contacts on the capacitive position sensing panel to obtain a plurality of candidate contacts.

Step 802: When the capacitive position sensing panel operates in a second operating mode, detect contacts on the capacitive position sensing panel to select part of the candidate contacts as actual contacts on the capacitive position sensing panel.

Step 804: When the capacitive position sensing panel operates in the first operating mode, provide a first input signal such that voltage levels of the sensing lines and the driving lines are substantially equal to a voltage level of the first input signal.

Step 806: When the capacitive position sensing panel operates in the second operating mode, provide a second input signal such that voltage levels of the driving lines which are under the candidate contacts are substantially equal to a voltage level of the second input signal.

Briefly summarized, regarding a circuit for determining positions of contacts on a capacitive position detecting panel, a touch panel module and method for detecting contacts on a capacitive position detecting panel, the present invention first uses a self capacitance sensing method to determine which sensing lines or driving lines have contacts presented thereon, and then uses a mutual capacitance sensing method to determine actual positions of the contacts on the capacitive position detecting panel. In addition, the present invention captures position signals of all the amplifiers while using the self capacitance sensing method and the mutual capacitance sensing method at the same time. In this way, the sensing time is shortened and the system power consumption is reduced.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A circuit for determining positions of contacts on a capacitive position sensing panel, wherein the capacitive position sensing panel comprises a plurality of sensing lines and a plurality of driving lines, and the sensing lines and the driving lines are intersected, the circuit comprising:
   a plurality of first amplifiers, respectively coupled to the sensing lines, for detecting whether the sensing lines have contact(s) presented thereon, wherein regarding each of the first amplifiers, a first input terminal of the first amplifier is coupled to a first input signal source, and a second input terminal of the first amplifier is coupled to an output terminal of the first amplifier via a first capacitor; and
   a plurality of second amplifiers, respectively coupled to the driving lines, for detecting whether the driving lines have contact(s) presented thereon, wherein regarding each of the second amplifiers, a first input terminal of the second amplifier is selectively coupled to the first input signal source or a second input signal source via a switch, and a second input terminal of the second amplifier is coupled to an output terminal of the second amplifier via a second capacitor;
   wherein when the circuit operates in a first operating mode, the first input terminal of each of the second amplifiers is coupled to the first input signal source, and when the circuit operates in a second operating mode, first input terminals of a plurality of specific second amplifiers included in the second amplifiers are coupled to the second input signal source.

2. The circuit of claim 1, further comprising:
   a determining circuit, coupled to output terminals of the second amplifiers;
   wherein when the circuit operates in the first operating mode, the determining circuit determines which driving line(s) have contact(s) presented thereon according to a plurality of output signals of the second amplifiers, and accordingly determines the specific second amplifiers in the second amplifiers.

3. The circuit of claim 1, wherein when the circuit operates in the second operating mode, first input terminals of the specific second amplifiers are coupled to the second input signal source, and first input terminals of the rest of the second amplifiers are coupled to the first input signal source.

4. The circuit of claim 1, wherein the first operating mode is enabled during a driving period of an active area of a scanning frame, and the second operating mode is enabled during a blanking period of the scanning frame.

5. The circuit of claim 1, wherein regarding each of the first amplifiers, the second input terminal of the first amplifier is further selectively coupled to the output terminal of the first amplifier via a first switch; and regarding each of the second amplifiers, the second input terminal of the second amplifier is further selectively coupled to the output terminal of the second amplifier via a second switch.

6. The circuit of claim 5, wherein:
   when the circuit operates in the first operating mode:
      regarding each of the first amplifiers and the second amplifiers, the first switch and the second switch are turned on;
   when the circuit operates in the second operating mode:
      regarding each of the first amplifiers and the second amplifiers, the first switch is turned on and the second switch is turned off; and
   when the circuit operates in neither the first operating mode nor the second operating mode, the first switch and the second switch are both turned off.

7. A touch panel module, comprising:
   a capacitive position sensing panel, having a plurality of sensing lines and a plurality of driving lines disposed thereon; and
   an integrated circuit, comprising:
      a plurality of first amplifiers, respectively coupled to the sensing lines of the capacitive position sensing panel, for detecting whether the sensing lines have contact(s) presented thereon, wherein regarding each of the first amplifiers, a first input terminal of the first amplifier is coupled to a first input signal source, and a second input terminal of the first amplifier is coupled to an output terminal of the first amplifier via a first capacitor; and
      a plurality of second amplifiers, respectively coupled to the driving lines of the capacitive position sensing panel, for detecting whether the driving lines have contact(s) presented thereon, wherein regarding each of the second amplifiers, a first input terminal of the second amplifier is selectively coupled to the first input signal source or a second input signal source via a switch, and a second input terminal of the second amplifier is coupled to an output terminal of the second amplifier via a second capacitor;
      wherein when the integrated circuit operates in a first operating mode, the first input terminal of each of the second amplifiers is coupled to the first input signal source, and when the integrated circuit operates in a second operating mode, first input terminals of a plurality of specific second amplifiers included in the second amplifiers are coupled to the second input signal source.

8. The touch panel module of claim 7, wherein the integrated circuit further comprises:
   a determining circuit, coupled to output terminals of the second amplifiers;
   wherein when the integrated circuit operates in the first operating mode, the determining circuit determines which driving line(s) have contact(s) presented thereon according to a plurality of output signals of the second amplifiers, and accordingly determines the specific second amplifiers in the second amplifiers.

9. The touch panel module of claim 7, wherein when the integrated circuit operates in the second operating mode, first input terminals of the specific second amplifiers are coupled to the second input signal source, and first input terminals of the rest of the second amplifiers are coupled to the first input signal source.

10. The touch panel module of claim 7, wherein the first operating mode is enabled during a driving period of an active area of a scanning frame, and the second operating mode is enabled during a blanking period of the scanning frame.

11. The touch panel module of claim 7, wherein regarding each of the first amplifiers, the second input terminal of the first amplifier is further selectively coupled to the output terminal of the first amplifier via a first switch; and regarding each of the second amplifiers, the second input terminal of the second amplifier is further selectively coupled to the output terminal of the second amplifier via a second switch.

12. The touch panel module of claim 11, wherein:
when the integrated circuit operates in the first operating mode:
regarding each of the first amplifiers and the second amplifiers, the first switch and the second switch are both turned on;
when the integrated circuit operates in the second operating mode:
regarding each of the first amplifiers and the second amplifiers, the first switch is turned on and the second switch is turned off; and
when the integrated circuit operates in neither the first operating mode nor the second operating mode, the first switch and the second switch are both turned off.

* * * * *